United States Patent [19]
Pivrnec et al.

[11] Patent Number: 6,097,117
[45] Date of Patent: Aug. 1, 2000

[54] ELECTRICAL CONNECTOR STRUCTURE INCLUDING INTEGRAL RESISTIVE ELEMENT FOR OPERATING A MOTOR AT TWO SPEEDS

[75] Inventors: Jan Pivrnec; Andrew Lakerdas; John Van de Vegte, all of London, Canada

[73] Assignee: Siemens Canada Limited, Mississauga, Canada

[21] Appl. No.: 09/317,799

[22] Filed: May 24, 1999

[51] Int. Cl.$^7$ .................................................. H02K 11/00
[52] U.S. Cl. ............................... 310/71; 339/31; 339/32; 439/221; 439/222; 439/213
[58] Field of Search .................. 310/71, 72, 68 A, 310/68 C, 68 R, 67 R; 339/31, 32; 439/221, 222, 213

[56] References Cited

U.S. PATENT DOCUMENTS

| | | | |
|---|---|---|---|
| 3,602,748 | 8/1971 | Locke | 339/31 |
| 3,967,147 | 6/1976 | Preiser et al. | 310/162 |
| 3,983,407 | 9/1976 | Shott | 307/146 |
| 3,983,428 | 9/1976 | Bitsch et al. | 310/38 R |
| 3,988,639 | 10/1976 | Preiser et al. | 317/9 R |
| 4,109,992 | 8/1978 | Hughes et al. | 339/147 R |
| 4,297,627 | 10/1981 | Schaefer | 318/778 |
| 4,626,060 | 12/1986 | Inayoshi | 339/147 |
| 4,677,941 | 7/1987 | Kurz | 123/41.12 |
| 4,880,391 | 11/1989 | Hurtgen | 439/221 |
| 4,937,482 | 6/1990 | Dohogne | 310/71 |
| 5,017,818 | 5/1991 | Dohogne | 310/74 |
| 5,310,016 | 5/1994 | Rudelle | 180/65.1 |
| 5,596,236 | 1/1997 | Lee et al. | 310/68 A |
| 5,629,574 | 5/1997 | Cognetti et al. | 310/71 |
| 5,734,219 | 3/1998 | Horski et al. | 310/240 |

*Primary Examiner*—Nestor Ramirez
*Assistant Examiner*—Thanh Lam

[57] ABSTRACT

A connector structure 10 is provided for powering an electric motor 19. The connector structure 10 includes a connector body 12; a low speed terminal 14 in the body; a high speed terminal 16 in the body; and a ground terminal 18 in the body. The ground terminal and the high-speed terminal are constructed and arranged to be coupled directly to the motor. The low speed terminal, the high speed terminal and the ground terminal are constructed and arranged to be coupled to a source of electrical power to power the motor. A resistive element 20 is coupled between the low speed terminal and the high-speed terminal. A shield member 26 houses the resistive element. The shield member is coupled directly to the connector body. Electrical power to the motor may be by controlled by selectively energizing the low speed terminal, the high speed terminal, or both the low speed terminal and high speed terminal so as to operate the motor at two different speeds.

19 Claims, 2 Drawing Sheets

ELECTRICAL CONNECTOR STRUCTURE INCLUDING INTEGRAL RESISTIVE ELEMENT FOR OPERATING A MOTOR AT TWO SPEEDS

FIELD OF THE INVENTION

This invention relates to electric motors for automobile applications and more particularly to an electrical connector structure, which permits an electric motor to operate at two different speeds.

BACKGROUND OF THE INVENTION

Electric motors for automobile applications are typically required to operate at two different speeds. One means of achieving the second motor speed is to provide a resistive element to the positive or negative motor lead in order to reduce the power applied to the motor. This results in a reduction of motor speed.

With reference to FIG. 1, a typical way of assembling the resistive element to the motor includes the addition of a lead assembly L connected to the motor M. Three lead wires are provided in the lead assembly L: two positive lead wires and the common ground. One of the positive lead wires and the common ground are coupled to the motor M to provide power to the motor M. Providing power to lead wire (1) at connector C allows the motor to operate at full speed. A resistive element R is attached between lead wire (2) and lead wire (1) such that when lead wire (2) is energized, the motor operates at a speed less than full speed. Lead wire (3) is the common negative lead. The resistive element R may be mounted in a housing H as shown and can also be incorporated into the negative side of the motor instead of the positive side of the motor.

The conventional lead wire assembly L has disadvantages in that it requires additional hardware such as the lead wires of assembly L, the resistive element R with a housing H, tubing T to protect the lead wires, attachment brackets and fasteners. Further, additional labor is required to assemble the lead wire assembly L and to mount the resistive element R and housing H to the vehicle.

Thus, there is a need to provide an electrical connector structure for a motor, which permits the motor to operate at two different speeds without the need for a complex lead wire assembly.

SUMMARY OF THE INVENTION

An object of the present invention is to fulfill the need referred to above. In accordance with the principles of the present invention, this objective is obtained by providing a connector structure for powering an electric motor. The connector structure includes a connector body; a low speed terminal in the body; a high-speed terminal in the body; and a ground terminal in the body. The ground terminal and the high-speed terminal are constructed and arranged to be coupled directly to the motor. The low speed terminal, the high speed terminal and the ground terminal are constructed and arranged to be coupled to a source of electric power to power the motor. A resistive element is coupled between the low speed terminal and the high-speed terminal. A shield member houses the resistive element. The shield member is coupled directly to the connector body. Electrical power to the motor may be controlled by selectively energizing the low speed terminal, the high speed terminal, or both the low speed terminal and high speed terminal so as to operate the motor at two different speeds.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
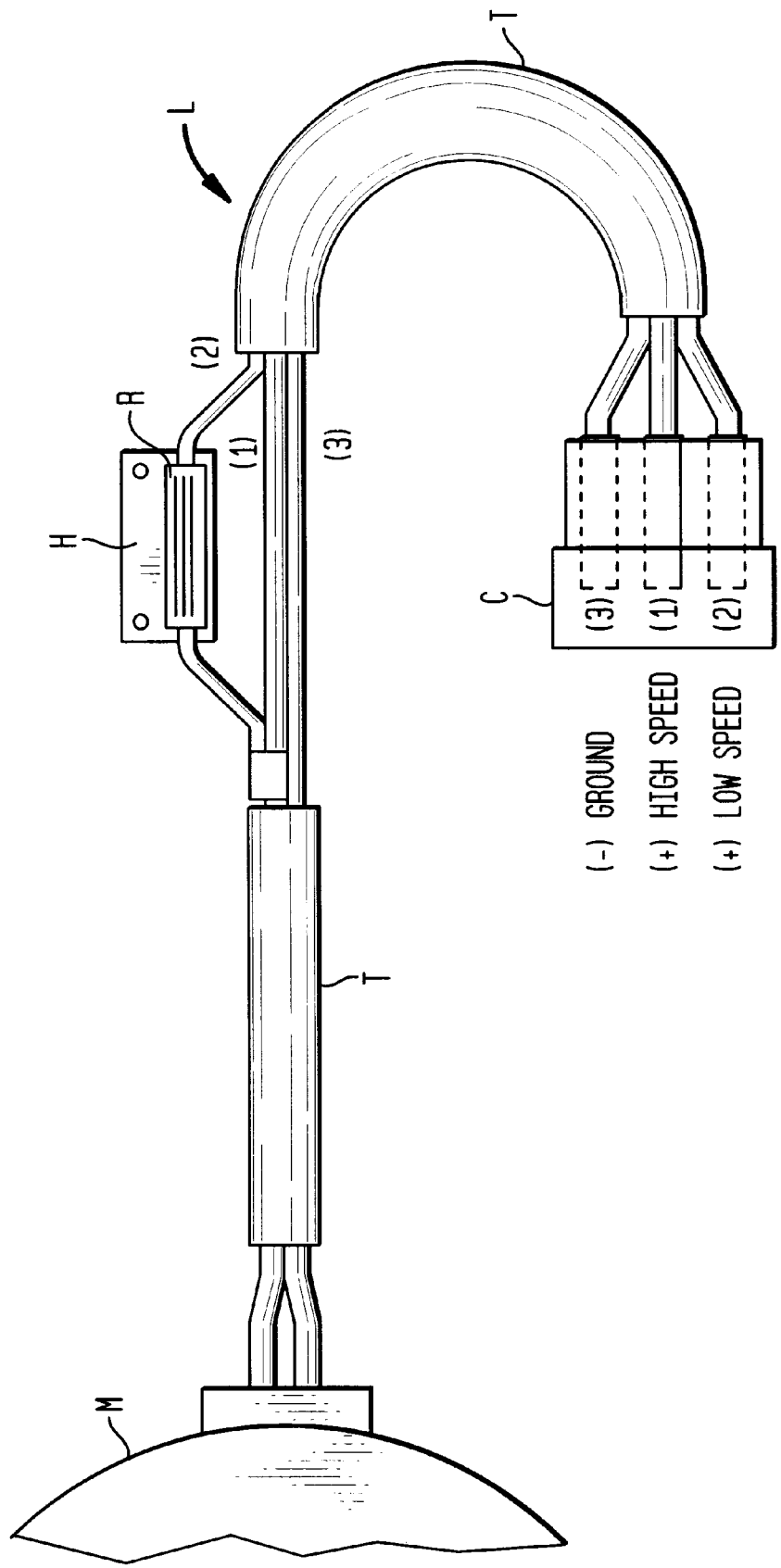
FIG. 1 is schematic illustration of a conventional lead wire assembly for an electric motor, which permits the motor to operate at two different speeds.
Figure 2:
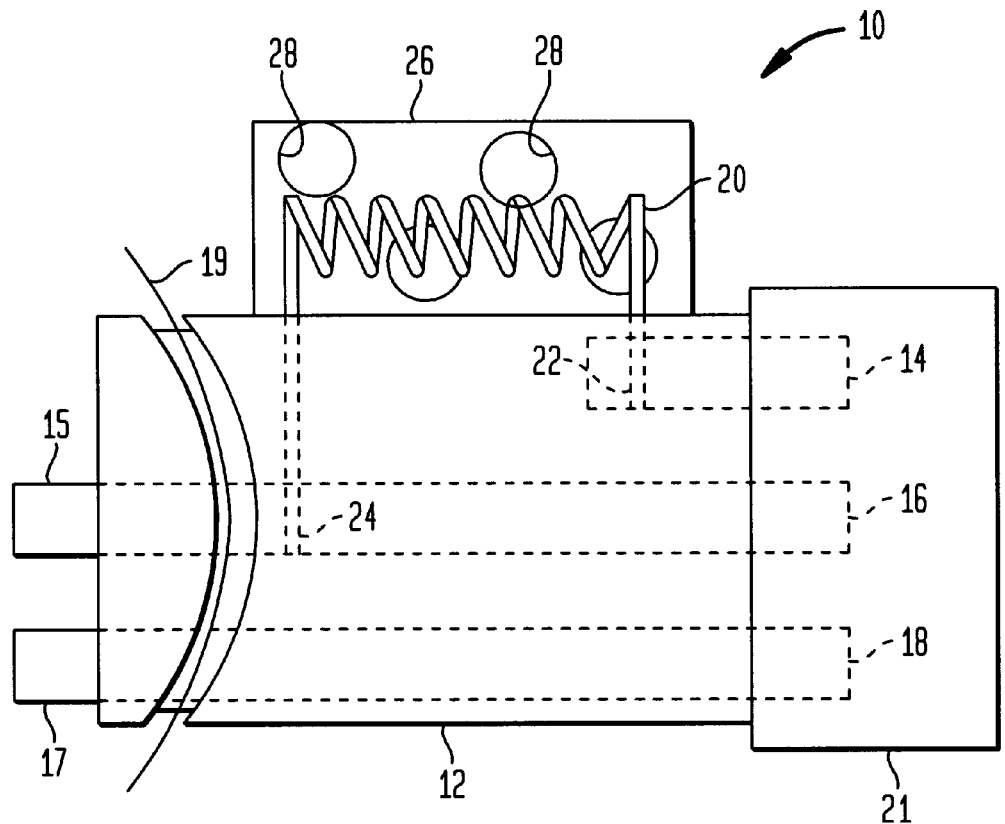
FIG. 2 is schematic illustration of a connector structure provided in accordance with the principles of the present invention, shown connected to an electric motor.

Referring to FIG. 2, an electrical connector structure is shown, generally indicated 10, provided in accordance with the principles of the present invention. The connector structure 10 includes a non-electrically conducting connector body 12, preferably of plastic material. The body 12 contains a low speed terminal 14, a high speed terminal 16 and a common ground terminal 18. In the illustrated embodiment, the high speed terminal 16 and the common ground terminal 18 have ends 15 and 17, respectively, constructed and arranged to be coupled directly to a motor 19 to power the motor 19. The connector structure 10 is therefore an integral part of the motor 19 with the connector body 12 attached to the motor casing and the terminal ends 15, 17 electrically attached directly to the interior components of the motor.

In addition, each of the terminals 14, 16 and 18 is constructed and arranged to be coupled directly to a source of electrical power at end 21 of the connector body 12. In the illustrated embodiment, the terminals 14, 16 and 18 include male contacts. However, the terminals may be of the female type if desired. As shown, the low and high-speed terminals are positive terminals while the ground terminal is the negative terminal. The motor 19 is constructed and arranged to be used in a vehicle, such as a cooling fan motor.

Figure 3:
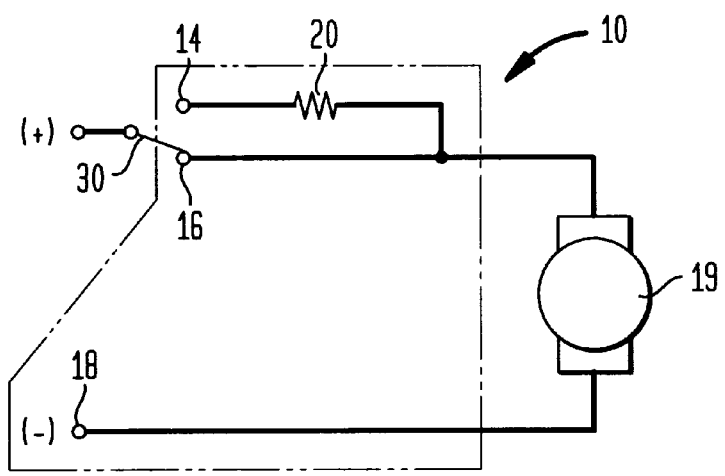
FIG. 3 is an electrical schematic of the connector structure of the invention, shown coupled between a motor and a switch.

In accordance with the invention and with reference to FIGS. 2 and 3, a resistive element 20 has a first lead 22 coupled to the low speed terminal 14 within the connector body 12. A second lead 24 of the resistive element 20 is coupled to the high speed terminal 16 within the connector body 12. The resistive element 20 is housed within a shield member 26, which is coupled directly to the connector body 12. Preferably, the shield member 26 and the connector body 12 are formed integrally from plastic material. If necessary, due to higher resistor power, the shield member 26 may be constructed of metal. The shield member 26 preferably includes openings 28 therein so that ambient air may cool the resistive element 20. The shield member 26 protects people from contacting the hot resistive element 20 and protects the resistive element 20 itself from being damaged.

As best shown in FIG. 3, a switch 30, preferably a relay, is provided upstream of the connector structure 10. The switch 30 dictates which connector terminal (high or low speed) is energized to provide the appropriate motor speed. If the high speed terminal 16 is energized, the motor 19 will operate at full power and thus at high speed. When the low speed terminal 14 is energized, the resistive element 20 reduces the voltage to the motor 19 and thus the motor 19 will operate at a speed less than full speed. It can be appreciated that when both terminals 14 and 16 are energized, the motor 19 also operates at full speed due to short-circuiting of the resistive element 20. Thus, when both terminals 14 and 16 are used for full speed motor operation, the switch structure 30 may include a low limit switch to control low speed motor operation and a high limit switch which, when actuated together with the low limit switch, permits the motor to operate at full speed.

The resistive element 20 is preferably a conventional resistor, the value of which is selected to provide the necessary power reduction to provide the desired motor speed reduction.

Although, in the illustrated embodiment, the resistive element 20 is associated with the positive side of the motor 19, it can be appreciated that the resistive element 20 may be associated with the negative side of the motor 19.

It can be appreciated that the resistive element coupled directly to the connector body provides a single connector structure that eliminates the need for a complex lead wire assembly and removes the disadvantages associated therewith.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A connector structure for powering an electric motor, the connector structure comprising:
   a connector body;
   a low speed terminal in said body;
   a high speed terminal in said body;
   a ground terminal in said body; said ground terminal and said high speed terminal being constructed and arranged to be coupled directly to the motor, and said low speed terminal, said high speed terminal and said ground terminal each being constructed and arranged to be coupled to a source of electric power to power the motor;
   a resistive element coupled between said low speed terminal and said high speed terminal; and
   a shield member housing said resistive element, said shield member being coupled directly to said connector body and extending outwardly therefrom,
      whereby, electrical power to the motor is controlled by selectively energizing said low speed terminal, said high speed terminal or both said low speed terminal and high speed terminal so as to operate the motor at two different speeds.

2. The connector structure according to claim 1, wherein said resistive element has a first lead coupled to said low speed terminal within said connector body, and a second lead coupled to said high speed terminal within said connector body.

3. The connector structure according to claim 1, in combination with switch structure operatively associated with said low speed terminal and high speed terminal and an electric power source to control power to said low speed terminal and high speed terminal.

4. The connector structure according to claim 3, wherein said switch structure is a relay.

5. The connector structure according to claim 1, wherein said connector body and said shield member are formed integrally from plastic material.

6. The connector structure according to claim 1, wherein said shield member is constructed of metal.

7. The connector structure according to claim 1, wherein said low speed terminal, said high speed terminal and said ground terminal each includes a male contact to be coupled to a source of electrical power.

8. A connector structure for powering an electric motor, the connector structure comprising:
   a connector body;
   a low speed terminal in said body;
   a high speed terminal in said body;
   a ground terminal in said body; said ground terminal and said high speed terminal being constructed and arranged to be coupled directly to the motor, and said low speed terminal, said high speed terminal and said ground terminal each being constructed and arranged to be coupled to a source of electric power to power the motor;
   a resistive element coupled between said low speed terminal and said high speed terminal; and
   a shield member housing said resistive element, said shield member being coupled directly to said connector body,
      whereby, electrical power to the motor is controlled by selectively energizing said low speed terminal, said high speed terminal or both said low speed terminal and high speed terminal so as to operate the motor at two different speeds,
      wherein said shield member includes at least one opening therein so as to permit ambient air to enter said shield member to cool said resistive element.

9. An electric motor and connector structure combination, comprising:
   an electric motor being constructed and arranged to be powered by two electrical leads; and
   a connector structure comprising:
      a connector body;
      a low speed terminal in said body;
      a high speed terminal in said body;
      a ground terminal in said body; said ground terminal and said high speed terminal defining said electrical leads, said low speed terminal, said high speed terminal and said ground terminal each being constructed and arranged to be coupled to a source of electric power to power the motor;
      a resistive element coupled between said low speed terminal and said high speed terminal; and
      a shield member housing said resistive element, said shield member being coupled directly to said connector body and extending outwardly therefrom,
   whereby, electrical power to the motor is controlled by selectively energizing said low speed terminal, said high speed terminal, or both said low speed terminal and high speed terminal so as to operate the motor at two different speeds.

10. The combination according to claim 9, wherein said resistive element has a first lead coupled to said low speed terminal within said connector body, and a second lead coupled to said high speed terminal within said connector body.

11. The combination according to claim 9, in further combination with switch structure operatively associated with said low speed terminal and high speed terminal and an electric power source to control power to said low speed terminal and high speed terminal.

12. The combination according to claim 11, wherein said switch structure is a relay.

13. The combination according to claim 9, further comprising a shield member shielding said resistive element, said shield member being directly coupled to said connector body.

14. The combination according to claim 13, wherein said connector body and said shield member are formed integrally from plastic material.

15. The combination according to claim 13, wherein said shield member is constructed of metal.

16. The combination according to claim 9, wherein said motor is constructed and arranged to be used as a vehicle cooling fan motor.

17. An electric motor and connector structure combination, comprising:
   an electric motor being constructed and arranged to be powered by two electrical leads; and
   a connector structure comprising:
      a connector body;
      a low speed terminal in said body;
      a high speed terminal in said body;
      a ground terminal in said body; said ground terminal and said high speed terminal defining said electrical leads, said low speed terminal, said high speed terminal and said ground terminal each being constructed and arranged to be coupled to a source of electric power to power the motor;
      a resistive element coupled between said low speed terminal and said high speed terminal; and
      a shield member housing said resistive element, said shield member being coupled directly to said connector body,
   whereby, electrical power to the motor is controlled by selectively energizing said low speed terminal, said high speed terminal, or both said low speed terminal and high speed terminal so as to operate the motor at two different speeds,
   wherein said shield member includes at least one opening therein so as to permit ambient air to enter said shield member to cool said resistive element.

18. A method of powering an electric motor including:
   providing a connector structure comprising:
      a connector body;
      a low speed terminal in said body;
      a high speed terminal in said body;
      a ground terminal in said body; said ground terminal and said high speed terminal defining electrical leads coupled to the motor, said low speed terminal, said high speed terminal and said ground terminal each being constructed and arranged to be coupled to a source of electric power to power the motor;
      a resistive element coupled between said low speed terminal and said high speed terminal; and
      a shield member housing said resistive element, said shield member being coupled directly to said connector body;
   providing switch structure operatively associated with said low speed terminal and said high speed terminal, said switch structure and said ground terminal being in communication with a source of electrical power; and
   selectively operating said switch structure to power said low speed terminal and said high-speed terminal in such a manner to operate the motor at two different speeds.

19. The method according to claim 18, wherein said motor is a vehicle cooling fan motor.

* * * * *